US 8,541,729 B2

(12) United States Patent
Yoshimoto et al.

(10) Patent No.: US 8,541,729 B2
(45) Date of Patent: Sep. 24, 2013

(54) IMAGE DISPLAY SYSTEM HAVING A DETECTION OF AN OVERLAPPING IN THE OUTPUT TIMING OF LASER BEAMS (75) Inventors: Tsuyoshi Yoshimoto, Fukuoka (JP); Takahisa Shiramizu, Saga (JP)

(73) Assignee: Panasonic Corporation, Osaka (JP)

( * ) Notice: Subject to any disclaimer, the term of this patent is extended or adjusted under 35 U.S.C. 154(b) by 269 days.

(21) Appl. No.: 13/224,979

(22) Filed: Sep. 2, 2011

(65) Prior Publication Data

US 2012/0062851 A1 Mar. 15, 2012

(30) Foreign Application Priority Data

Sep. 13, 2010 (JP) ................. 2010-204033

(51) Int. Cl.
*G01J 1/32* (2006.01)
(52) U.S. Cl.
USPC ........................................... 250/205; 353/85
(58) Field of Classification Search
USPC ............... 250/205, 208.1, 214 R; 353/85, 353/30, 31, 34; 362/231, 293; 372/38.01–38.07, 25, 37; 345/207, 213, 345/290, 690
See application file for complete search history.

(56) References Cited

U.S. PATENT DOCUMENTS 8,264,762 B2 * 9/2012 Inoue et al. .................. 359/290
2009/0161031 A1 6/2009 Kaise

FOREIGN PATENT DOCUMENTS

JP 2007-316393 12/2007
JP 2008-16833 1/2008

OTHER PUBLICATIONS

U.S. Appl. No. 13/226,659 to Takahisa Shiramizu et al., which was filed Sep. 7, 2011.

* cited by examiner

*Primary Examiner* — Que T Le
(74) *Attorney, Agent, or Firm* — Greenblum & Bernstein, P.L.C.

(57) ABSTRACT

The image display system comprises laser light source units (2 to 4) for emitting green, red and blue laser beams, a laser output control unit (52) and a drive control unit (53). Upon detecting an overlapping in the output timing of the laser beams of two or more of the laser light source units, the drive control unit ceases the application of the drive current to at least one of the two or more laser light source units according to the output control signal.

10 Claims, 8 Drawing Sheets

| No. | LD_ON | LD_RON | LD_BON | LD_GON | Ir | Ib | Ig |
|---|---|---|---|---|---|---|---|
| 1 | L | — | — | — | L | L | L |
| 2 | H | L | L | L | L | L | L |
| 3 | H | H | L | L | H | L | L |
| 4 | H | L | H | L | L | H | L |
| 5 | H | L | L | H | L | L | H |
| 6 | H | H | H | L | L | L | L |
| 7 | H | H | L | H | L | L | L |
| 8 | H | L | H | H | L | L | L |
| 9 | H | H | H | H | L | L | L |

*Fig.8*

| No. | LD_ON | LD_RON | LD_BON | LD_GON | Ir | Ib | Ig |
|---|---|---|---|---|---|---|---|
| 1 | H | H | H | H | H | L | L |
| 2 | H | H | H | L | H | L | L |
| 3 | H | H | L | H | H | L | L |
| 4 | H | L | H | H | L | L | H |

IMAGE DISPLAY SYSTEM HAVING A DETECTION OF AN OVERLAPPING IN THE OUTPUT TIMING OF LASER BEAMS

TECHNICAL FIELD

The present invention relates to an image display system based on a time sharing display process using semiconductor lasers as laser light sources.

BACKGROUND OF THE INVENTION

In recent years, there is a growing interest in the use of the semiconductor laser as the light source of image display systems. The semiconductor laser has various advantages over the mercury lamp which is commonly used as the light source for more conventional image display systems, such as a better color reproduction, the capability to turn on and off instantaneously, a longer service life, a higher efficiency (or a lower power consumption) and the amenability to compact design.

An example of image display system using a semiconductor laser is disclosed in JP 2007-316393A. Three lasers beams of red, blue and green colors generated by three laser light source units consisting of semiconductor lasers are projected onto a display area of a reflective LCD panel, and the light beams of the different colors imaged and reflected by the reflective LCD panel are projected onto an external screen.

No semiconductor laser that can directly generate a green laser beam at a high power output is available, but it is known to use a laser beam obtained from a semiconductor laser for exciting a laser medium to generate a red laser beam, and convert the red laser beam into a green laser beam by using a nonlinear optical process (wavelength converting device) as disclosed in JP 2008-16833A.

In an image display device such as the one disclosed in JP 2007-316393A, it is possible to display pixels of desired colors either by forming each pixel with a mixture of red, green and blue (RGB) colors (space sharing display system) or by switching between laser beams of red, green and blue colors at high speed for each pixel (time sharing display system).

In the case of the time sharing display system, as it is designed that the laser beams are emitted from a green laser light source unit, a red laser light source unit and a blue laser light source unit in a sequential manner, the laser beams of different colors are not normally emitted simultaneously for each pixel. However, in reality, due to improper laser output control, a plurality of laser beams may be emitted at the same time so that some of the pixels displayed on the screen may become excessively bright, and this is known to cause discomfort to the eyes of the viewer.

BRIEF SUMMARY OF THE INVENTION

In view of such problems of the prior art, a primary object of the present invention is to provide a color image display system based on a time sharing display process that can effectively prevent or minimize the simultaneous emission of a plurality of laser beams of different colors, and thereby avoid the discomfort to the eyes of the viewer.

To achieve such an object, the present invention provides an image display system based on a time sharing display process using a semiconductor laser as a light source, comprising: a plurality of laser light source units for emitting laser beams of different colors; a laser output control unit for producing an output control signal that controls an output timing of the laser beam of each laser light source unit; and a drive control unit for producing a drive control signal that controls an application of a drive current to each laser light source unit according to the output control signal; wherein, upon detecting an overlapping in the output timing of the laser beams of two or more of the laser light source units, the drive control unit is configured to cease the application of the drive current to at least one of the two or more laser light source units according to the output control signal.

Another object of the present invention is to reduce the discomfort to the eyes of the viewer without entirely ceasing the output of the laser beam. To this end, the drive control unit may be configured to apply the drive current only to one of the laser light source units that emits a laser beam of a longest wavelength.

BRIEF DESCRIPTION OF THE DRAWINGS

Now the present invention is described in the following with reference to the appended drawings, in which.

DETAILED DESCRIPTION OF THE PREFERRED EMBODIMENT(S)

Figure 1:
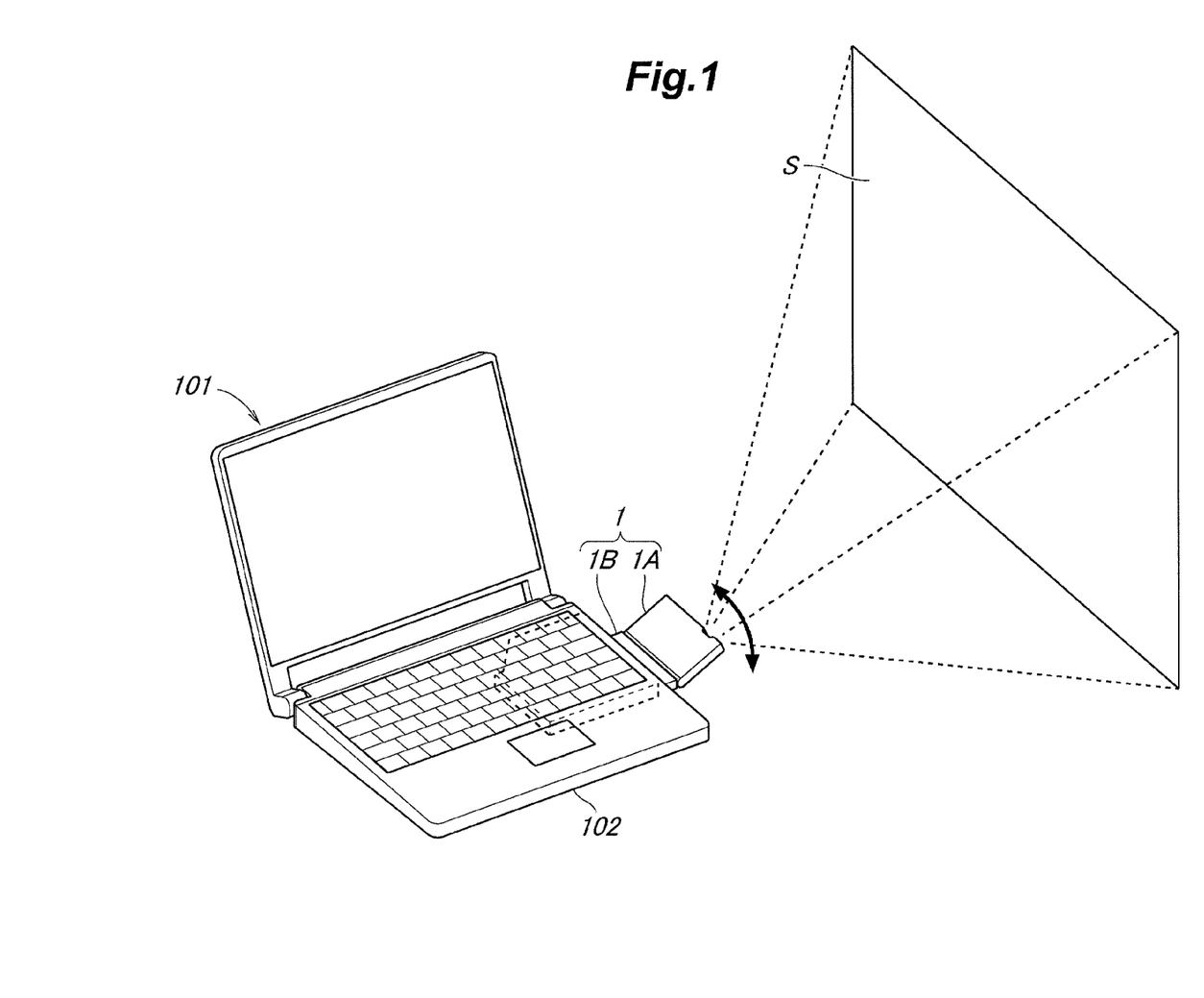
FIG. 1 is a perspective view of a notebook type information processing apparatus incorporated with an image display system embodying the present invention.

FIG. 1 is a perspective view of an information processing apparatus 101 incorporated with an image display system 1 embodying the present invention. The information processing apparatus 101 of the illustrated embodiment is constructed as a laptop computer including a housing 102 having a keyboard formed on one side (upper side in FIG. 1) thereof, and a display panel hinged to the housing 102 in a per se known manner. The housing 102 internally defines a storage space behind the keyboard in which an image display system 1 can be received from a side end of the housing 102, and can be pulled out from the side end as required. The image display system 1 includes a control unit 1B slidably received in the internal storage space, and an optical engine unit 1A pivotally connected to the free end of the control unit 1B. By vertically tilting the optical engine unit 1A relative to the control unit 1B, a laser beam emitted from the image display system 1 can be directed onto an external screen S.

Figure 2:
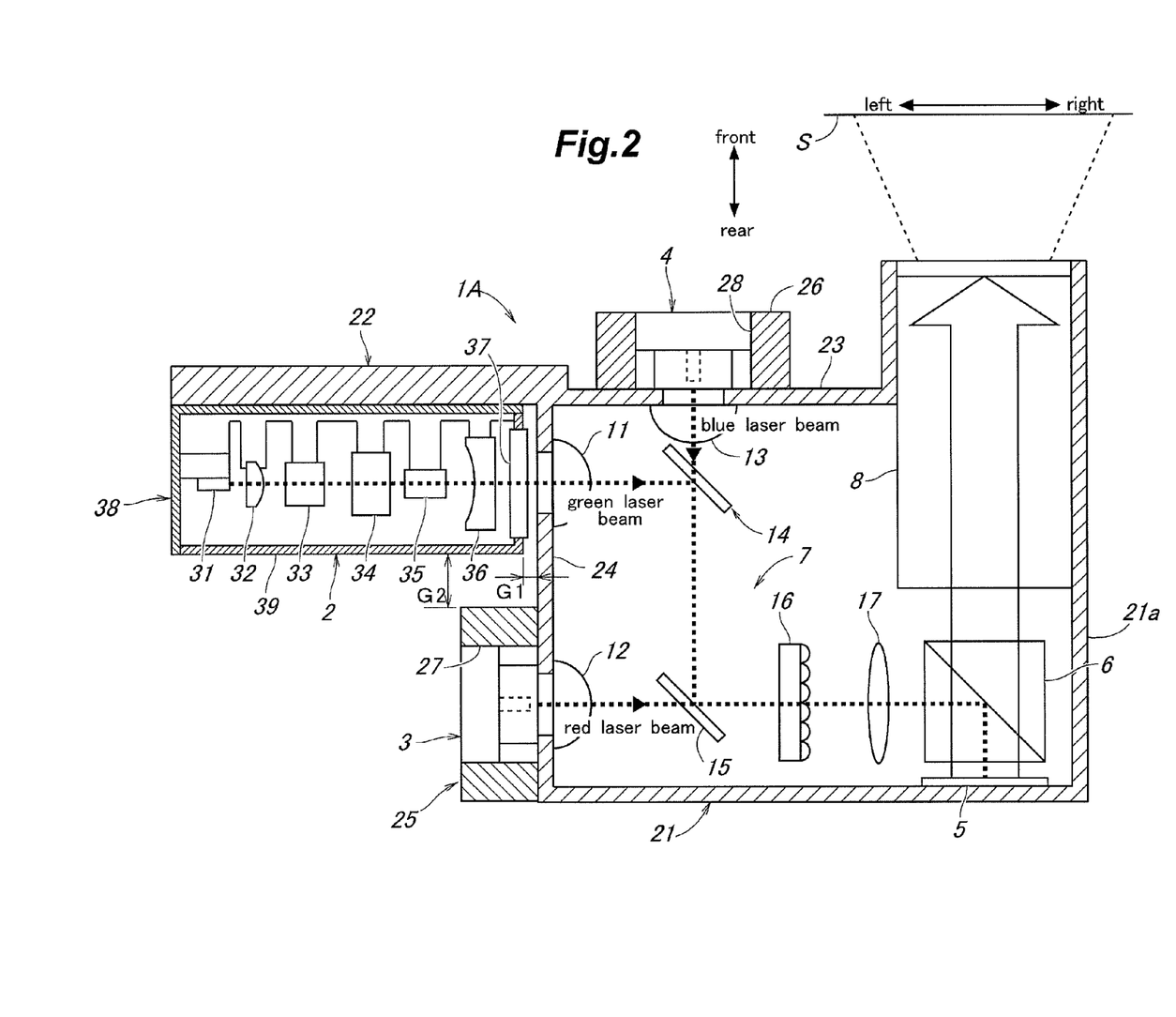
FIG. 2 is a schematic diagram illustrating an optical engine unit of the image display system.

FIG. 2 is a schematic diagram illustrating the optical engine unit 1A of the image display system 1. The optical engine unit 1A is configured to project a given image onto a screen S, and comprises a green laser light source unit 2 for emitting a green laser beam, a red laser light source unit 3 for emitting a red laser beam, a blue laser light source unit 4 for emitting a blue laser beam, a spatial light modulator 5 of a reflective LCD type for forming the required image by spatially modulating the laser beams from the green, red and blue laser light source units 2 to 4 according to the given video signal, a polarizing beam splitter 6 that reflects the laser beams emitted from the green, red and blue laser light source units 2 to 4 onto the spatial light modulator 5 and transmits the modulated laser beam emitted from the spatial light modulator 5, a relay optical system 7 for directing the laser beams emitted from the green, red and blue laser light source units 2 to 4 to the beam splitter 6, and a projection optical system 8 for projecting the modulated laser beam transmitted through the beam splitter 6 onto the screen S.

The laser beam from the image display system 1 is configured to display a color image by using the field sequential process (time sharing display process), and the laser beams of different colors are emitted from the corresponding laser light source units 2 to 4 sequentially in a time sharing manner so that the laser beams of the different colors emitted intermittently and scanned over the screen are perceived as a unified color afterimage.

The relay optical system 7 comprises collimator lenses 11 to 13 for converting the laser beams of different colors emitted from the corresponding laser light source units 2 to 4 into parallel beams of the different colors, first and second dichroic mirrors 14 and 15 for directing laser beams of the different colors exiting the collimator lenses 11 to 13 in a prescribed direction, a diffusion plate 16 for diffusing the laser beams guided by the dichroic mirrors 14 and 15 and a field lens 17 for converting the laser beam transmitted through the diffusion plate 16 into a converging laser beam.

If the side of the projection optical system 8 from which the laser beam is emitted to the screen S is defined as the front side, the blue laser light source unit 4 emits the blue laser beam in the rearward direction. The green and red laser light source units 2 and 3 emit the green laser beam and red laser beam, respectively, in a direction perpendicular to the blue laser beam. The blue, red and green laser beams are conducted to a common light path by the two dichroic mirrors 14 and 15. In other words, the blue laser beam and green laser beam are conducted to a common light path by the first dichroic mirror 14, and the blue laser beam, red laser beam and green laser beam are conducted to a common light path by the second dichroic mirror 15.

The surface of each dichroic mirror 14, 15 is coated with a film that selectively transmits light of a prescribed wavelength while reflecting light of other wavelengths. The first dichroic minor 14 transmits the blue laser beam while reflecting the green laser beam, and the second dichroic mirror 15 transmits the red laser beam while reflecting the blue and green laser beams.

These optical components are received in a housing 21 which is made of thermally conductive material such as aluminum and copper so as to serve as a heat dissipator for dissipating the heat generated from the laser light source units 2 to 4. The housing 21 additionally receives the spatial light modulator 5, the beam splitter 6, the relay optical system 7 and the projection optical system 8.

The green laser light source unit 2 is mounted on a mounting plate 22 secured to the housing 21 and extending laterally from the main body 21a of the housing 21. The mounting plate 22 serves as a heat sink by extending from the corner between a front wall 23 and a side wall 24 of the housing 21 (which are located on the front and side of the storage space receiving the relay optical system 7, respectively) in a direction perpendicular to the side wall 24. Thereby, the heat is favorably removed from the green laser light source unit 2 and the removed heat is prevented from being transmitted back to the housing 21 so that the thermal effect on the remaining two laser light source units 3 and 4 may be minimized. The red laser light source unit 3 is retained in a holder 25 which is in turn attached to the outer surface of the side wall 24, and the blue laser light source unit 4 is retained in a holder 26 which is in turn attached to the outer surface of the front wall 23.

The red and blue laser light source units 3 and 4 are each prepared in a CAN package in which a laser chip supported by a stem is placed on the central axial line of a can so as to emit a laser beam in alignment with the central axial line of the can and out of a glass window provided on the can. The red and blue laser light source units 3 and 4 are secured to the respective holders 25 and 26 by being press fitted into mounting holes 27 and 28 formed in the corresponding holders 25 and 26. The heat generated in the laser chips of the red and blue laser light source units 3 and 4 is transmitted to the housing 21 via the holders 25 and 26, and is dissipated to the surrounding environment from the housing 21. The holders 25 and 26 may be made of thermally conductive material such as aluminum and copper.

As shown in FIG. 2, the green laser light source unit 2 comprises a semiconductor laser 31 for producing an excitation laser beam, a FAC (fast axis collimator) lens 32 and a rod lens 33 for collimating the excitation laser beam produced from the semiconductor lens 31, a laser medium 34 for producing a base wavelength laser beam (infrared laser beam) through excitation by the excitation laser beam, a wavelength converting device 35 for producing a half wavelength laser beam (green laser beam) by converting the wavelength of the base wavelength laser beam, a concave mirror 36 for forming a resonator in cooperation with the laser medium 34, a glass cover 37 for preventing the leakage of the excitation laser beam and base wavelength laser beam, a base 38 for supporting the various component parts and a cover member 39 covering the various components.

As shown in FIG. 2, a gap G1 of a prescribed width (such as 0.5 mm or less) is formed between the green laser light source unit 2 and the side wall 24 of the housing 21. Thereby, the heat generated from the green laser light source unit 2 is insulated from the red laser light source unit 3 so that the red laser light source unit 3 having a relatively low tolerable temperature is prevented from heat, and is enabled to operate in a stable manner. To obtain a required adjustment margin (such as about 0.3 mm) for the optical center line of the red laser light source unit 3, a certain gap G2 (such as 0.3 mm or more) is provided between the green laser light source unit 2 and the red laser light source unit 3.

Figure 3:
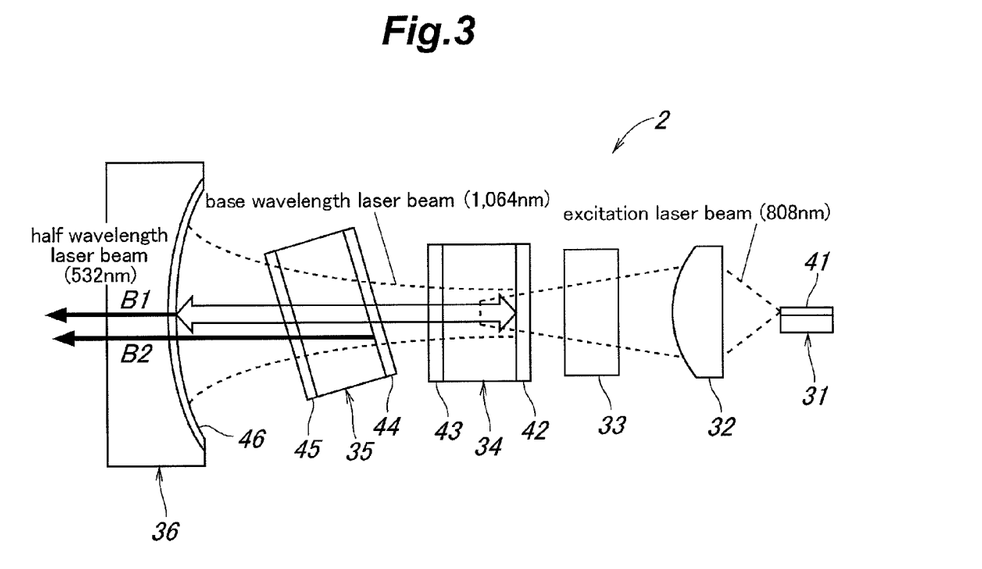
FIG. 3 is a diagram showing how a green laser beam is generated by a green laser light source unit of the image display system.

FIG. 3 is a diagram showing how the green laser beam is generated by the green laser light source unit 2 of the image display system 1. The semiconductor laser 31 comprises a laser chip 41 that produces an excitation laser beam having a wavelength of 808 nm. The FAC lens 32 reduces the expansion of the laser beam in the direction of the fast axis of the laser beam (which is perpendicular to the optical axial line and in parallel with the plane of the paper of the drawing), and the rod lens 33 reduces the expansion of the laser beam in the direction of the slow axis of the laser beam (which is perpendicular to the plane of the paper of the drawing).

The laser medium 34 consists of a solid laser crystal that produces a base wavelength laser beam (infrared laser beam) having a wavelength of 1,064 nm by the excitation caused by the excitation laser beam having the wavelength of 808 nm. The laser medium 34 may be prepared by doping inorganic optically active substance (crystal) consisting of Y (yttrium) and $VO_4$ (vanadate) with Nd (neodymium). In particular, yttrium in $YVO_4$ is substituted by $Nd^{+3}$ which is fluorescent.

The side of the laser medium 34 facing the rod lens 33 is coated with a film 42 designed to prevent the reflection of the excitation laser beam having the wavelength of 808 nm, and fully reflect the base wavelength laser beam having the wavelength of 1,064 nm and the half wavelength laser beam having the wavelength of 532 nm. The side of the laser medium 34 facing the wavelength converting device 35 is coated with a film 43 designed to prevent the reflection of both the base wavelength laser beam having the wavelength of 1,064 nm and the half wavelength laser beam having the wavelength of 532 nm.

The wavelength converting device 35 consists of a SHG (Second Harmonics Generation) device that is configured to convert the base wavelength laser beam (infrared laser beam) having the wavelength of 1,064 nm generated by the laser medium 34 into the half wavelength laser beam having the wavelength of 532 nm (green laser beam). The wavelength converting device 35 includes a ferroelectric crystal formed with periodically poled regions, and the base wavelength laser beam is directed along the direction of the alternating arrangement of the periodically poled regions. The ferroelectric crystal may consist of LN (lithium niobate) added with MgO.

The side of the wavelength converting device 35 facing the laser medium 34 is coated with a film 44 that prevents the reflection of the base wavelength laser beam having the wavelength of 1,064 nm, and fully reflects the half wavelength laser beam having the wavelength of 532 nm. The side of the wavelength converting device 35 facing the concave mirror 36 is coated with a film 45 that prevents the reflection of both the base wavelength laser beam having the wavelength of 1,064 nm and the half wavelength laser beam having the wavelength of 532 nm.

The concave mirror 36 is provided with a concave surface that faces the wavelength converting device 35, and the concave surface is coated with a film 46 that fully reflects the base wavelength laser beam having the wavelength of 1,064 nm, and prevents the reflection of the half wavelength laser beam having the wavelength of 532 nm. Thereby, the base wavelength laser beam having the wavelength of 1,064 nm is amplified by resonance between the film 42 of the laser medium 34 and the film 46 of the concave mirror 36.

The wavelength converting device 35 converts a part of the base wavelength laser beam having the wavelength of 1,064 nm received from the laser medium 34 into the half wavelength laser beam having the wavelength of 532 nm, and the remaining part of the base wavelength laser beam having the wavelength of 1,064 nm that has transmitted through the wavelength converting device 35 without being converted is reflected by the concave mirror 36, and re-enters the wavelength converting device 35 to be converted into the half wavelength laser beam having the wavelength of 532 nm. The half wavelength laser beam having the wavelength of 532 nm is reflected by the film 44 of the wavelength converting device 35, and exits the wavelength converting device 35.

If the laser beam B1 that enters the wavelength converting device 35 from the laser medium 34, and exits the wavelength converting device 35 after being converted of the wavelength thereof interferes with the laser beam B2 that is reflected by the concave mirror 36, and exits the wavelength converting device 35 after being reflected by the film 44, the laser output may be reduced. To avoid this problem, the wavelength converting device 35 is tilted with respect to the optical axial line so that the laser beams B1 and B2 are prevented from interfering with each other owing to the refraction of the laser beams B1 and B2, and the reduction in the laser output can be avoided.

The glass cover 37 shown in FIG. 2 is formed with a film that prevents the leakage of the base wavelength laser beam having the wavelength of 1,064 nm and the half wavelength laser beam having the wavelength of 532 nm to the outside.

In the foregoing description, the laser chip 41 of the green laser light source unit 2, the laser medium 34 and the wavelength converting device 35 generated the excitation laser beam having a wavelength of 808 nm, the base wavelength laser beam (infrared laser beam) having the wavelength of 1,064 nm and the half wavelength laser beam having the wavelength of 532 nm (green laser beam), respectively, but the present invention is not limited by this example. As long as the laser beam emitted from the green laser light source unit 2 can be perceived as green color, the output may be a laser beam having a peak wavelength range of 500 nm to 560 nm, for instance.

Figure 4:
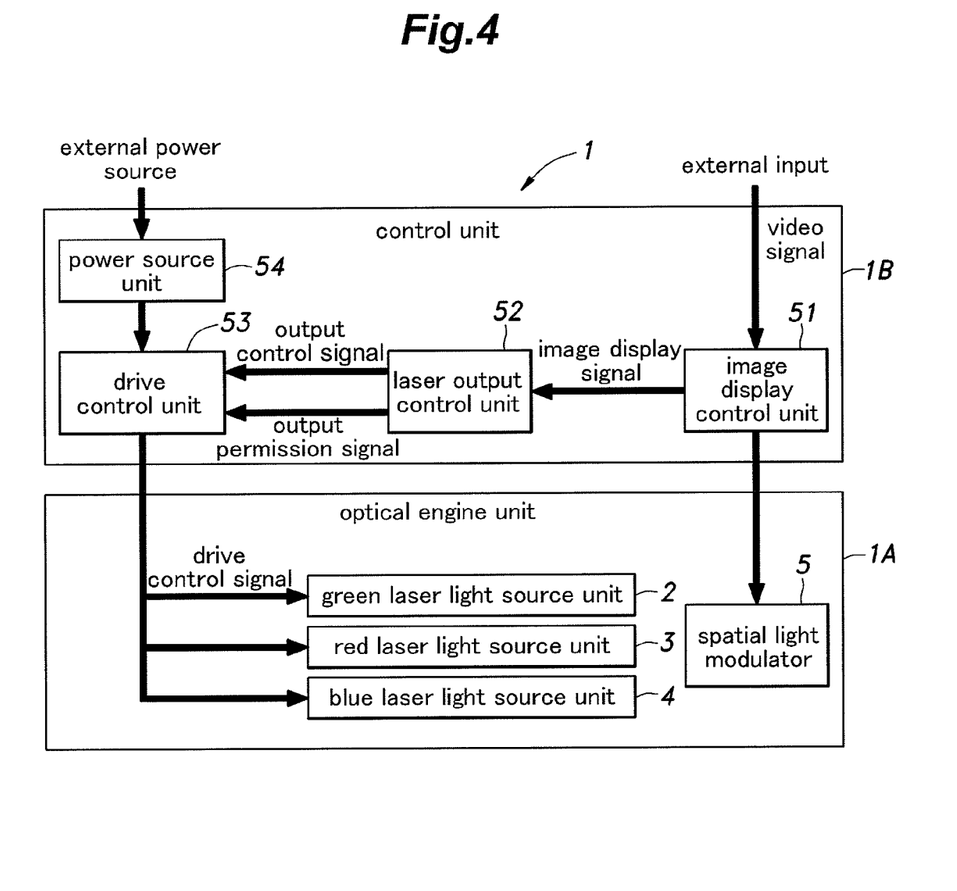
FIG. 4 is a functional block diagram of the image display system.

FIG. 4 is a functional block diagram of the image display system 1 of the present embodiment. The control unit 1B includes an image display control unit 51 that is responsible for the overall control of the various parts of the system. Upon receiving a video signal from an external input, the image display control unit 51 forwards an image display signal to the laser output control unit 52 to control the operation of the spatial light modulator 5 and the outputs of the laser light source units 2 to 4 for the different colors according to the brightness information and other information of the video signal. Based on the image display signal received from the image display control unit 51, the laser output control unit 52 forwards an output control signal for controlling the output levels and output timings of the laser beams and an output permission signal for commanding the output of each laser beam to the drive control unit 53.

The drive control unit 53 is connected to a power source unit 54 that converts AC power received from an external power source to DC power that can be used by the image display system 1. Based on the output control signal and output permission signal received from the laser output control unit 52, the drive control unit 53 produces a drive control signal for controlling the application of the drive current to each laser light source unit 2 to 4. Each of the control units 51 to 53 may be formed by a CPU, ROM, ROM, an input/output interface circuit and various computer programs.

Figure 5:
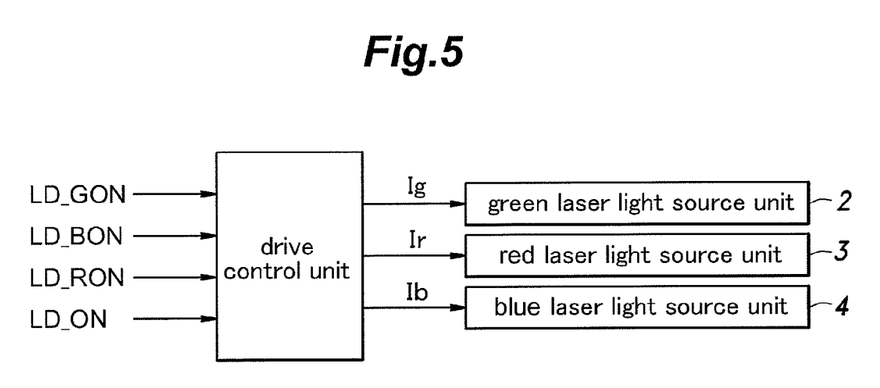
FIG. 5 is a block diagram illustrating the flow of signals in the drive control unit shown in FIG. 4.

FIG. 5 is a block diagram illustrating the flow of signals in the drive control unit 53 shown in FIG. 4. The drive control unit 53 receives the output control signal and output permission signal from the laser output control unit 42. The output control signals includes LD_GON for the green laser light source unit 2, LD_RON for the red laser light source unit 3 and LD_BON for the blue laser light source unit 4, and the output permission signal is given as LD_ON. Based on these signals LD_GON, LD_RON, LD_BON and LD_ON, the drive control unit 53 forwards drive control signals Ig, Ir and Ib to the corresponding laser light source units 2 to 4.

Figure 6:
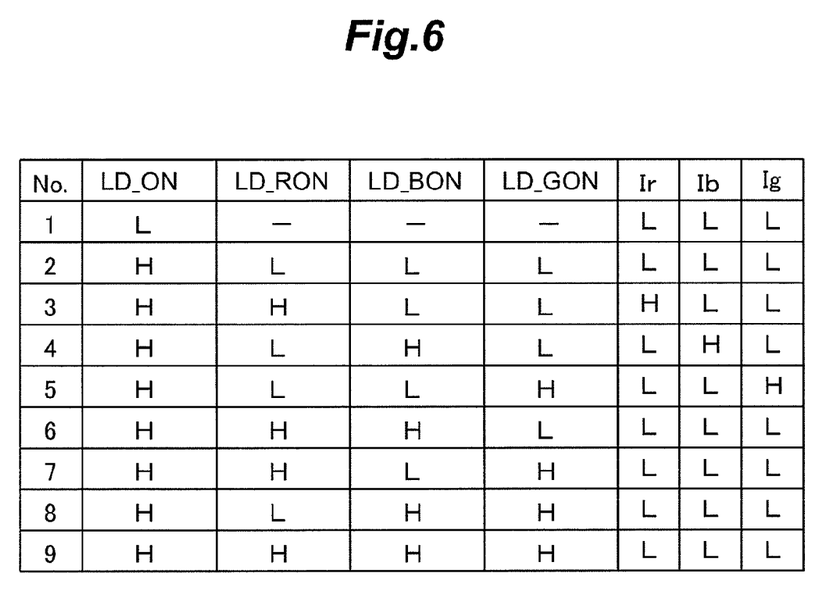
FIG. 6 is a table showing the input waveform (output control signal input) and output waveform (drive control signal output) of the drive control unit shown in FIG. 5.
Figure 7:
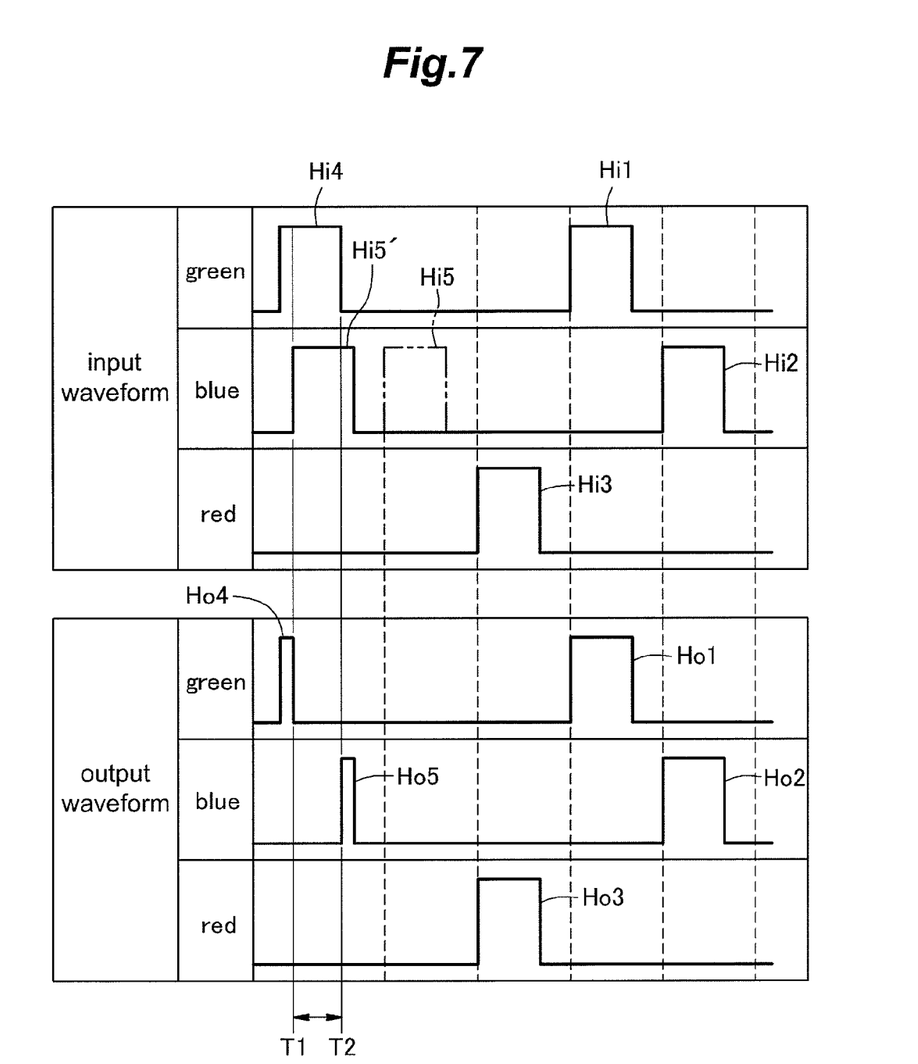
FIG. 7 is a graph showing the input waveform (output control signal input) and output waveform (drive control signal output) of the drive control unit shown in FIG. 5.

FIG. 6 is a table showing the output control signal input and the drive control signal output of the drive control unit 53 shown in FIG. 5, and FIG. 7 is a graph showing the output control signal input and the drive control signal output of the drive control unit 53 shown in FIG. 5. In FIG. 6, for each of a plurality of cases (No. 1 to No. 9), the states (high level H or low level L) of the output control signals received at a same timing, and the states of the resulting drive control signals (high level H or low level L) produced at the same timing are shown. The drive current is applied to each laser light source unit when the corresponding drive current signal is at the high level H.

As shown in case No. 1 of FIG. 6, when the LD_ON signal is low level (L), none of the control signals are forwarded to the drive control unit 53, and as it means that the output of laser beams is not permitted, the drive control unit 53 produces drive control signals (Ig, Ir and Ib) that are all at low level. Therefore, the drive current is applied to none of the laser light source units.

On the other hand, when the LD_ON signal is at high level, the output of the laser beams is permitted. Therefore, at this time, if the laser output control unit 52 applies the output control signals (LD_GON, LD_RON and LD_BON) of either high or low level to the drive control unit 53, the drive control unit 53 forwards the corresponding drive control signals (Ig, Ir and Ib) of either high or low level to the corresponding laser light source unit.

More specifically, when the high level pulse signals Hi1 to Hi3 for the different laser light source units are applied at mutually different timings (ordinate) (with no overlapping in timing) as represented by the input waveforms of the input control signals in FIG. 7, the drive control unit 53 produces high level pulse signals Ho1 to Ho3 that correspond to the high level pulse signals Hi1 to Hi3 as represented by the output waveforms of the drive control unit in FIG. 7. Therefore, the drive current is supplied to each of the laser light source units according to the timing and pulse width of the corresponding high level pulse signal Hi1 to Hi3, and the laser beams of the different colors are sequentially emitted in a time sharing manner.

In this manner, under normal condition, the high level pulses representing the output timing of each different laser beam from the corresponding output control unit does not overlap in timing with the high level pulses for the laser beams of the remaining colors. However, due to a failure (such as a thermal runaway, malfunction, etc.) of the laser output control unit 53, two or more of the high level pulses may overlap with each other in timing. Therefore, as shown in cases No. 6 to No. 9 in FIG. 6, upon detecting an overlap in two or more of the high level pulses that are received from the laser output control unit 52, the drive control unit 53 determines that the two or more of the laser light beams from the corresponding laser light source units will overlap (either totally or partly) with each other in timing, and produces all of the drive control signals (Ig, Ir and Ib) as low level signals.

Suppose that the high level pulse signal for the green laser light source unit, which should be generated in an non-overlapping with the high level pulse signal Hi4 for the blue laser light source as indicated by Hi5 (double-dot chain-dot line), may be generated in an overlapping timing with the high level pulse signal Hi4 for the blue laser light source as indicated by Hi5' (solid line) owing to a failure in output control. Therefore, the high level pulse signals for the green and blue laser light source units overlap with each other over the time interval of T1 to T2. This is not desirable as it gives rise to an unacceptably bright pixel which may cause discomfort to the eyes of the viewer. Therefore, in such a case, the high level output signals Ho4 and Ho5 are suppressed during the interval of T1 to T2, and are converted into two narrower pulse signals that are separated from each other by the time period of T2−T1. Thereby, the two laser beams (the green and blue laser beams) are prevented from being emitted at the same time, and the discomfort to the eyes of the viewer can be avoided.

In the foregoing embodiment, the drive control unit 53 forced all of the laser light source units to produce low level drive control signals (ceased the application of the drive current to all of the laser light source units) when two or more high level output control signals are received in an overlapping timing from the laser output control unit 52, but the present invention is not limited by this embodiment, but may also cease the application of the drive current to all but one of the laser light source units. If three or more high level output control signals are received in an overlapping timing from the laser output control unit 52, it is also possible to cease the application of the drive current to only one of the laser light source units.

Figure 8:
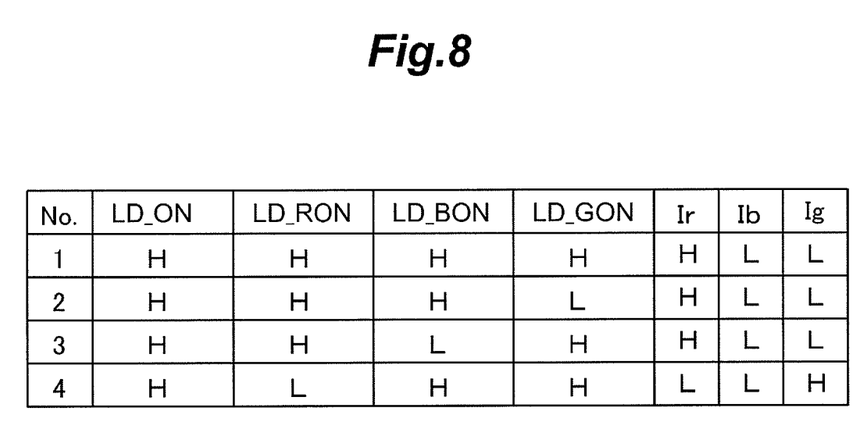
FIG. 8 is a table similar to that of FIG. 6 showing a variation of the input and output signals of the drive control unit.

FIG. 8 shows a table similar to that of FIG. 6. This table represents a modification of the relationship between the input and output signals in the drive control unit 53. As shown in cases 1 to 4 in FIG. 8, when the laser output control unit 52 forwards two high level H output control signals simultaneously or in the same timing to the drive control unit 53, the drive control unit 53 determines that the laser beams of two or more of the laser light source units will overlap with each other in timing. At such a time, the drive control unit 53 produces a drive control signal such that the drive current is applied to only one of the laser light source units out of the laser light source units corresponding to the overlapping high level signals.

In such a case, as indicated by case No. 1 to No. 3, the red laser beam or the laser beam having a relatively long wavelength is preferentially produced. When the red laser beam is not involved, the green laser beam is selected over the blue laser beam as the former has a longer wavelength than the latter. Thereby, the discomfort to the eyes of the viewer can be avoided without interrupting the laser output. Therefore, when a high level pulse should be produced in a continuous manner, the laser beam having the least impact on the eyes of the view continues to be produced, and thereby notify the viewer of the failure in the image display system.

Although the present invention has been described in terms of preferred embodiments thereof, it is obvious to a person skilled in the art that various alterations and modifications are possible without departing from the scope of the present invention which is set forth in the appended claims. The various components that are used in the image display system are not necessarily indispensable for the present invention, but may be omitted or substituted in implementing the present invention without departing from the spirit of the present invention.

The contents of the original Japanese patent applications on which the Paris Convention priority claim is made for the present application as well as the contents of the prior art references mentioned in this application are incorporated in this application by reference.

The invention claimed is:

1. An image display system based on a time sharing display process using a semiconductor laser as a light source, comprising:
   a plurality of laser light source units for emitting laser beams of different colors;
   a laser output control unit for producing an output control signal that controls an output timing of the laser beam of each laser light source unit; and
   a drive control unit for producing a drive control signal that controls an application of a drive current to each laser light source unit according to the output control signal;
   wherein, upon detecting an overlapping in the output timing of the laser beams of two or more of the laser light source units, the drive control unit is configured to cease the application of the drive current to at least one of the two or more laser light source units according to the output control signal.

2. The image display system according to claim 1, wherein the laser light source units comprise a green laser light source unit, a red laser light source unit and a blue laser light source unit.

3. The image display system according to claim 2, wherein the green laser light source unit comprises an output unit for generating an infrared laser beam and a wavelength converting device that converts the infrared laser beam into a green laser beam.

4. The image display system according to claim 2, wherein, upon detecting an overlapping in the output timing of the laser beams of two or more of the laser light source units, the drive control unit is configured to apply the drive current only to one of the laser light source units that emits a laser beam of a longest wavelength.

5. The image display system according to claim 4, wherein the red laser bean is preferentially emitted over the other two laser beams, and, when there is no output of the red laser beam, the green laser beam is preferentially emitted over the blue laser beam.

6. The image display system according to claim 1, wherein the image display system is configured to be received in a storage space defined in an information processing apparatus when not in use, and deployed out of the storage space when in use.

7. An image display system based on a time sharing display process using a semiconductor laser as a light source, comprising:
- a plurality of laser light source units for emitting laser beams of different colors; and
- a laser output control unit for producing an output control signal that controls an output timing of the laser beam of each laser light source unit;
- wherein, upon detecting an overlapping in the output timing of the laser beams of two or more of the laser light source units, the laser output control unit is configured to control the output timing of the two or more of the laser light source units so as to minimize or eliminate the overlapping in the output timing.

8. The image display system according to claim 7, wherein, upon detecting an overlapping in the output timing of the laser beams of two or more of the laser light source units, the laser output control unit is configured to cease the output of all of the two or more of the laser light source units.

9. An image display method for displaying an image by using a plurality of laser beams of different colors generated by laser light source units, comprising:
- generating an output control signal for controlling an output timing of the laser beams generated by the laser light source units;
- generating a drive control signal for controlling an application of a drive current to each laser light source unit according to the output control signal; and
- upon detecting an overlapping in the output timing of the laser beams of two or more of the laser light source units according to the output control signal, ceasing the application of the drive current to at least one of the two or more of the laser light source units according to the drive control signal.

10. An image display method for displaying an image by using a plurality of laser beams of different colors generated by laser light source units, comprising:
- upon detecting an overlapping in an output timing of the laser beams of two or more of the laser light source units, controlling the output timing of the laser beams of the two or more of the laser light source units so as to cease the overlapping in the output timing of the laser beams of the two or more of the laser light source units.

* * * * *